United States Patent
Martin

(10) Patent No.: US 6,679,670 B1
(45) Date of Patent: Jan. 20, 2004

(54) ENHANCED POP RIVET

(75) Inventor: Dannie E. Martin, Casselberry, FL (US)

(73) Assignee: Cingular Wireless, LLC, Atlanta, GA (US)

( * ) Notice: Subject to any disclaimer, the term of this patent is extended or adjusted under 35 U.S.C. 154(b) by 0 days.

(21) Appl. No.: 10/243,202

(22) Filed: Sep. 13, 2002

(51) Int. Cl.[7] ................................................. F16B 19/08
(52) U.S. Cl. ........................................ 411/501; 411/505
(58) Field of Search .............................. 411/501, 500, 411/504, 506, 508, 509, 510; 470/27–30

(56) References Cited

U.S. PATENT DOCUMENTS

| | | | | |
|---|---|---|---|---|
| 4,904,137 A | * | 2/1990 | Matuschek | 411/501 |
| 5,551,816 A | * | 9/1996 | Brewer et al. | 411/501 |
| 5,645,383 A | * | 7/1997 | Williams | 411/501 |
| 5,733,086 A | * | 3/1998 | Jakob | 411/501 |

* cited by examiner

Primary Examiner—Frederick L. Lagman
(74) Attorney, Agent, or Firm—Coulter C. Henry

(57) ABSTRACT

An enhanced pop rivet capable of joining materials that may not be joined using a conventional pop rivet is provided. The pop rivet has contains a detachable shank that exposes a sharpened brad when removed. A user may then impale a second material with the sharpened brad so that the second piece of material becomes securely attached.

7 Claims, 2 Drawing Sheets

ENHANCED POP RIVET

FIELD OF THE INVENTION

The present invention relates particularly to an enhanced pop rivet.

BACKGROUND OF THE INVENTION

A pop rivet is used to join two different types of material. A conventional pop rivet consists of two parts: a drive pin and a rivet housing. The drive pin is usually a solid cylindrical rod made of a hardened material, such as steel. The rivet housing is usually a hollow cylindrical tube open at both ends with a flange at its top end. The inside of the rivet housing is a hollow cylindrical cavity that encompasses the entire rivet housing. The diameter of the hollow cylindrical cavity is slightly less than the diameter of the drive pin on the top and tapering to a reduced size towards the bottom of the rivet housing. The bottom of the rivet housing is slit lengthwise in three or four locations (120° or 900° apart so as to be equally spaced) and these slits extend upwards along the rivet housing for some fraction of its total length, stopping before they reach the top flange. The length of the rivet housing left unslit is determined by the thickness of the materials to be joined.

In the assembled pop rivet device the drive pin is mounted into the rivet housing from the top so that a part of its length is exposed above the flange on the rivet housing. The drive pin is held in place by friction, since the pin is slightly larger than the upper rivet housing cavity, and extends as far down into the rivet housing chamber as the tapered rivet housing interior allows without deforming the rivet housing. Note that the total length of the drive pin is greater than the total length of the rivet housing.

The conventional pop rivet fastener is used in the following manner. First the materials to be joined, which are typically thin metal base sheets, are placed against one another. Then a hole is drilled through the sheets where the rivet is to be placed, with the hole diameter just large enough to accommodate the rivet housing. Next the rivet is inserted bottom first into the hole by hand for affixing, with the top flange prohibiting the rivet from being pushed completely through the base sheets. The rivet is properly positioned when the base of the top flange lies flush against the top base sheet. The length of the rivet housing is chosen in conjunction with the materials being joined so that part of the rivet housing will emerge from the other side of the base sheets from which it entered.

The rivet is then affixed in the following manner. A blow is delivered by the operator to the head of the rivet, striking the drive pin which protrudes above the rivet housing flange. The pin is thus driven further downward into the rivet housing's tapered interior cavity where the force of the blow, assisted by the slits in the rivet housing, causes the rivet housing to mushroom open on the other side of the base sheets thereby securely fixing the rivet, and hence the sheets to be joined, in place. In the usual case the top of the drive pin is flush with the top flange and the bottom of the pin emerges slightly from the bottom of the split rivet housing when the riveting is completed. The operator's blow which starts this sequence is delivered by an operator using a simple hand hammer, pneumatic tool or similar device.

This conventional rivet fastener is limited by the types of materials it may fasten. A conventional rivet fastener is unable to fasten certain materials such as fiber glass to wood. The present invention, however, may attach wood to fiber glass and to a variety of other thin materials.

SUMMARY OF THE INVENTION

In accordance with the purpose of the invention, as embodied and broadly described herein, the invention comprises an enhanced pop rivet comprising: a rivet body having a longitudinal axis and a first and second end, separated from one another along the longitudinal axis by a washer, the first end of the rivet body being configured to provide the rivet body with a deformable rivet base, the rivet body additionally having a shank that extends longitudinally from the washer to the second end, wherein the shank has an outer surface that is substantially cylindrical, wherein the shank has a cavity that that expands from a cavity disposed between the washer and the second end of the rivet body to an opening at the end of the second body, wherein the cavity contains a brad that is fixed to the washer and extends along the cavity to the opening at the end of the second body.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1A:
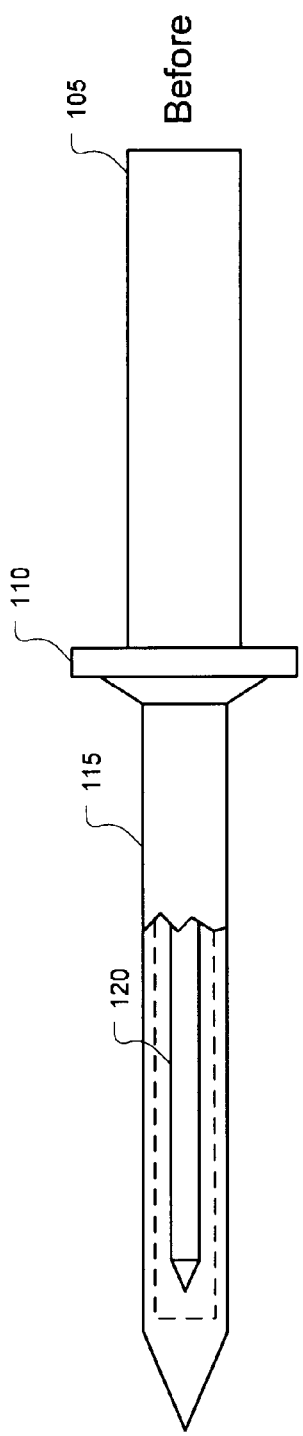
FIGS. 1A and 1B are diagrams illustrating the enhanced pop rivet according to the present invention.
Figure 1B:
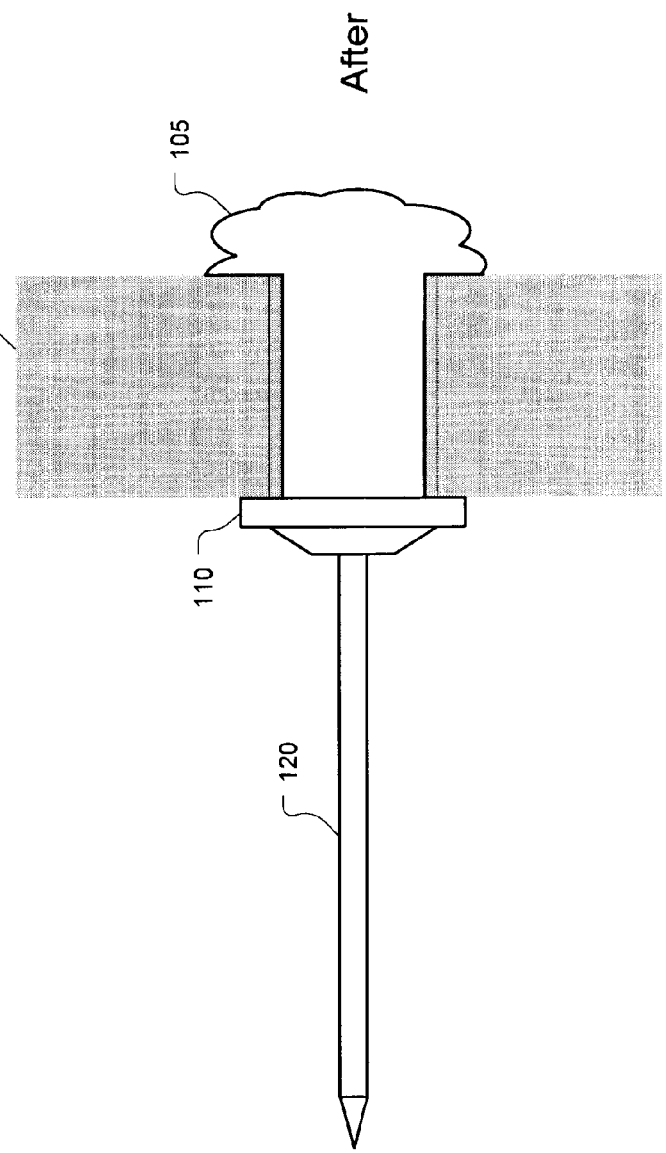

FIG. 1A is a diagram of the enhanced pop rivet. There are four parts that make up the rivet body of the enhanced pop rivet: a deformable rivet base 105 comprises the first end of the rivet body, a shank 115 and a brad 120 which together comprise the second end of the rivet body, and a washer 110 separates the two bodies. As shown in FIG. 1A, the deformable rivet base 105 comprises a deformable cylindrically shaped material attached to the washer 110. The washer 110 is a circular disc attached to the deformable rivet base 105, the shank 115 and the brad 120. The shank 115 is attached to the washer 110 and is capable of being detached from the washer 110. The shank 115 is a hollow cylindrical tube attached to the washer 110. The shank 115 encloses the brad 120. As shown in FIG. 1B, the deformable rivet base 105 will deform when sufficient force is applied to the deformable rivet base 105. In FIG. 1B, the enhanced pop rivet has been attached to a piece of sheet metal 210.

Figure 2:
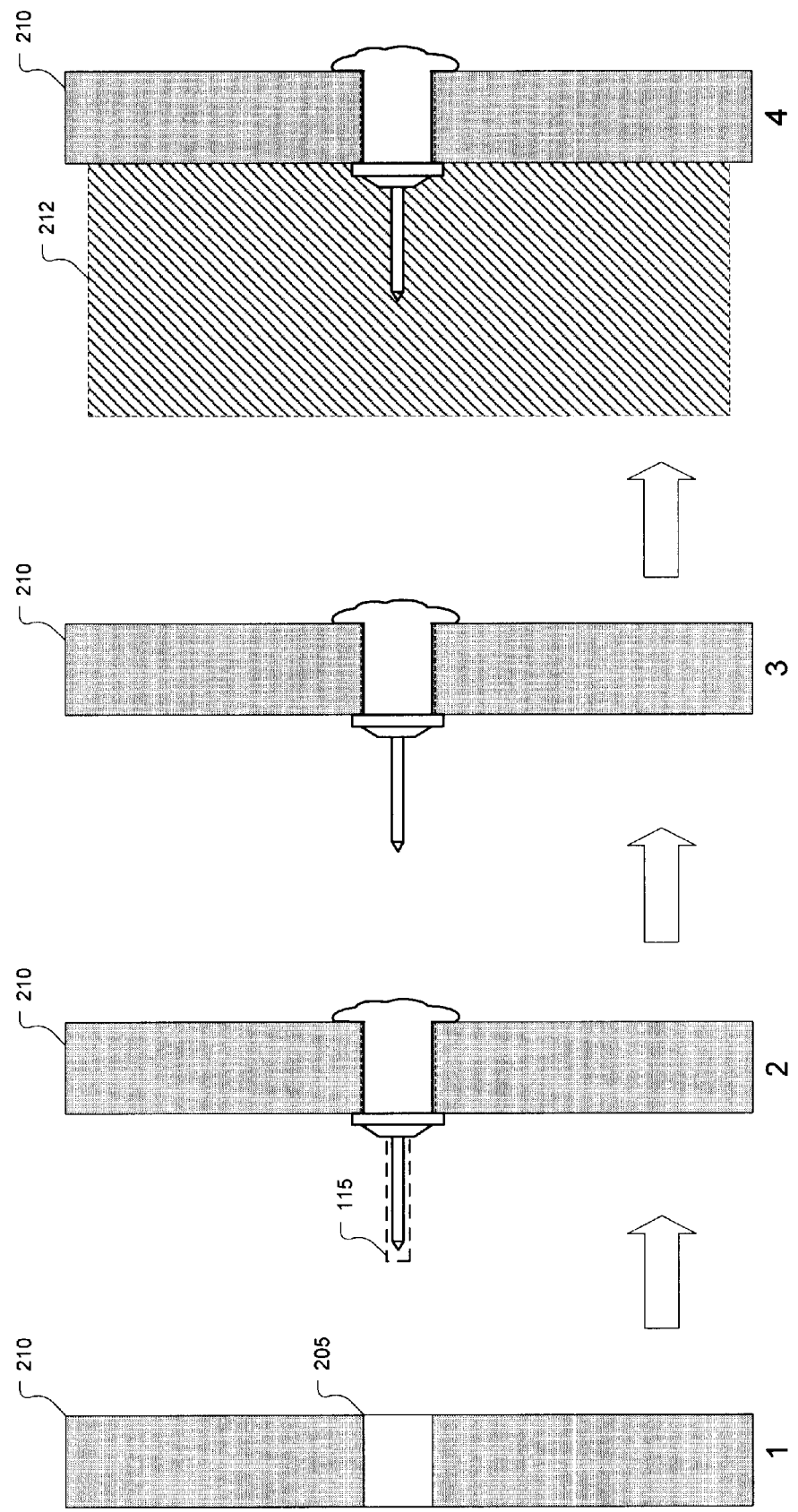
FIG. 2 is a diagram of the process used to attach the enhanced pop rivet.

FIG. 2 is a diagram of the process followed in attaching the enhanced pop rivet to a piece of sheet metal 210. It should be appreciated that the piece o sheet metal is used for illustrative purposes only. The enhanced pop rivet may be attached to any items conventional in the art. First in step 1, a hole 205 is drilled in a piece of sheet metal 210. The hole 205 should be of a diameter greater than the diameter of the deformable rivet base 105 but smaller than the diameter of the washer 110. Next in step 2, the deformable rivet base 105 is inserted into the hole 205. The deformable rivet base 105 is deformed around the surface of the sheet metal 210, after it has been inserted in to the sheet metal 210. This creates a seal between the sheet metal 210 and the deformed deformable rivet base 105. The washer 110 prevents the enhanced pop rivet from passing through the hole 205. The washer 110 and shank 115 are exposed on the side of the sheet metal 210 opposite the deformed deformable rivet base 105. In step 3, the shank 115 is removed from the washer 110 and the brad 120 is exposed. The brad 120 serves to adhere another material, such as wood 212 to the sheet metal 210. In step 4, a layer of wood 212 is attached to the sheet metal 210 by impaling the wood 212 with brad 120. The length of brad 120 will vary depending upon the thickness of the material to which it will be attached. In addition, the brad 120 may contain ridges to provide a better grip on the material.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An enhanced pop rivet comprising:

a rivet body having a longitudinal axis and a first and second end, separated from one another along the longitudinal axis by a washer, the first end of the rivet body being configured to provide the rivet body with a deformable rivet base, the rivet body additionally having a shank that extends longitudinally from the washer to the second end, wherein the shank has an outer surface that is substantially cylindrical, wherein the shank has a cavity that extends between the washer and the second end of the rivet body, wherein the cavity contains a brad that is fixed to the washer and extends along the cavity to the second end.

2. An enhanced pop rivet as described in claim 1, wherein the shank is detachable from the washer.

3. An enhanced pop rivet as described in claim 1, wherein the deformable rivet base is comprised of soft aluminum.

4. An enhanced pop rivet as described in claim 1, wherein the brad is comprised of material capable of piercing through wood.

5. An enhanced pop rivet as described in claim 1, wherein the surface of the brad has ridges to securely attach a second piece of material different from a first piece of material to which the enhanced pop is attached.

6. An enhanced pop rivet as described In claim 1, wherein the deformable rivet base deforms against a surface.

7. An enhanced pop rivet as described in claim 1, wherein the surface is wood.

* * * * *